March 15, 1955     McDUFF W. LAMB     2,704,259
SAUSAGES
Filed March 15, 1954
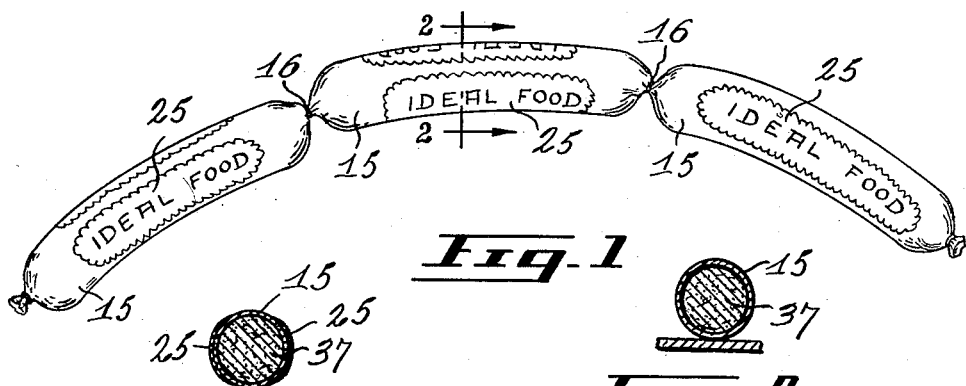
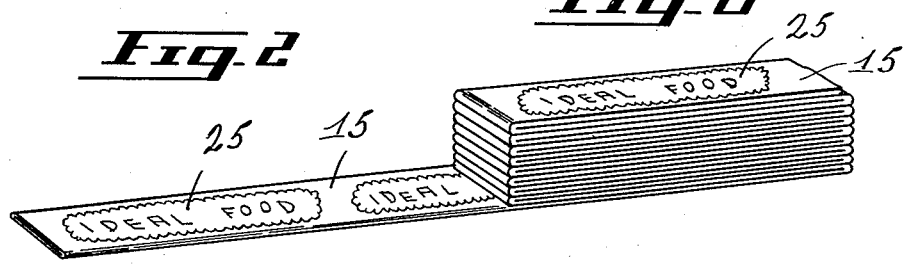
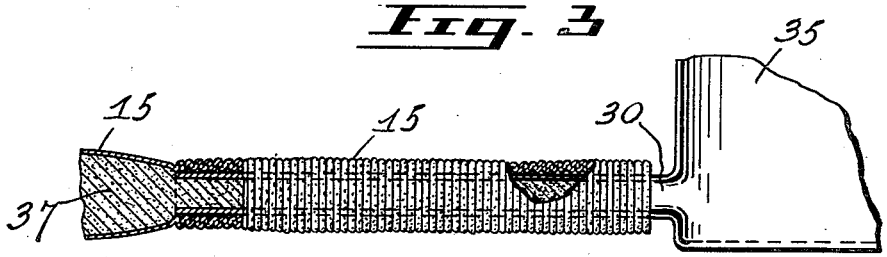
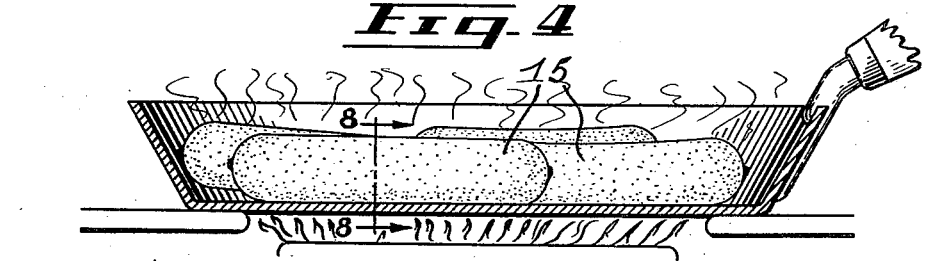
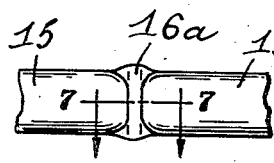
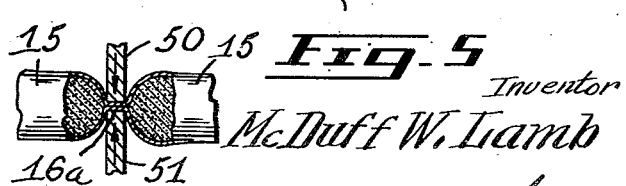
Inventor
McDuff W. Lamb
By Alan Awabey
Attorney

2,704,259

SAUSAGES

McDuff W. Lamb, Montreal, Quebec, Canada

Application March 15, 1954, Serial No. 416,363

3 Claims. (Cl. 99—176)

This invention relates to sausages and similar articles of cookable food in which an edible emulsion or filling is encased in a casing which forms part of the actual article which is cooked.

Prior art

Casings of synthetic plastic material have been used in place of natural sheep, lamb, beef, calf or hog gut or bladder casings. This is to get away from the disadvantages and expense of natural casings. The latter fluctuate in price. Also, the natural gut is not uniform in diameter from one end to the other and unless graded as to size can only be used with difficulty on sausages handled by automatic linking machinery. Grading increases the cost.

Previous synthetic casings are not edible so must be removed from the sausage after cooking. They cannot be removed before cooking because the sausage filling is not self-supporting and would disintegrate.

The applicant provides an article which avoids the disadvantage of sausages encased in either natural gut casings or prior types of synthetic casings.

The sausages of the invention are made up of an emulsion encased in a casing of polyethylene tubing which has substantially the characteristics, as far as retaining the emulsion is concerned, of an animal gut casing. The casing is pliable and water-insensitive. The invention contemplates single sausages as well as chains of link sausages in which the casing is knotted, tied or otherwise constricted at intervals to separate the individual sausages in the chain.

The polyethylene is moisture-stable and heat-stable to normal temperatures. But, the casing disintegrates at cooking temperatures. So, when the sausage is cooked, the casing disappears or becomes detached from the emulsion leaving the cooked food as a more or less self-sustaining skinless sausage.

The stuffing of the sausages may be performed by the ordinary apparatus used for stuffing animal gut casings.

The polyethylene casing should be as thin as possible. A preferred range of thickness is from about ¾ mil (.00075 inch) to about 2 mils (.002 inch). The tube making up the casing may be extruded or otherwise formed from material purchased on the market as "straight polyethylene flake."

The polyethylene has to be of a molecular weight, on the one hand effective to form a self-supporting film and on the other hand effective for extrusion. The applicant has found that normal commercial grades of polyethylene having a molecular weight within the range of from about 16,000 to about 22,000 are effective. Preferably, the molecular weight is within the range of from about 18,000 to about 20,000.

The sausages may be cooked by boiling, frying or roasting. As they are turned in the pan while being fried the casing melts leaving the sausage skinless but whole. The skin can either be lifted off during the cooking operation or allowed to melt into the dripping.

When the sausage is boiled, the casing splits and separates from the meat leaving the sausage intact but skinless.

Tests have shown that there is no harmful residue left on the sausage after cooking. These tests have also shown that any residue in the dripping has no harmful effect when repeatedly ingested. In fact, from the standpoint of nutrition, the use of polyethylene as a sausage casing is without significance and its accidental ingestion completely immaterial to the health or metabolism of the consumer, with exception that it is an improvement over the natural gut casing which has an unavoidable population of micro-organisms which tend to accelerate decomposition of the emulsion it contains.

Detailed description

The invention will be understood in more detail by referring to the accompanying drawings illustrating preferred embodiments, and in which:

Figure 1 is a perspective view of a chain of link-sausages, according to the invention.

Figure 2 is a vertical cross-section along the line 2—2 of Figure 1.

Figure 3 is a perspective view of a length of sausage casing according to the invention, laid flat and folded for convenient handling.

Figure 4 is a side elevation partly in section showing the stuffing horn, the casing and the emulsion passing from the horn into the casing.

Figure 5 is a vertical cross-section partly in elevation through a frying pan showing the sausages being fried.

Figure 6 is a perspective view showing an alternate way of linking the sausages.

Figure 7 is a cross-section along the line 7—7 of Figure 6.

Figure 8 is a cross-section along the line 8—8 of Figure 5.

Referring more specifically to Figures 1 and 2, the finished sausages, according to the invention, are made up of a casing 15 and emulsion 37. The casing is linked conventionally as at 16 to provide individual links or sausages. This can be done by "twisting" as with natural gut casings, or by tying a drawstring around at the linking point. The latter procedure is used with some types of automatic linking machines. Printing 25 may be provided on the casing for identification and advertising purposes.

The sausages may be stuffed by placing the casing 15 accordion-wise on a stuffing horn 30 forming a part of stuffing apparatus 35. The casing is stuffed by forcing the emulsion 37 from the stuffing apparatus 35 into casing, as understood in the art. The stuffed casing is then linked as at 16.

Linking may be performed in the ordinary way on a linking machine or by hand or, alternatively, links may be formed by heat-sealing the polyethylene as shown in Figures 6 and 7 to provide connecting webs 16a. This can be done by bringing heat-sealing members 50 and 51 together against stuffed casing at intervals. This forms the webs 16a in which the opposite sides of the casing have been pressed together expelling the sausage emulsion from between them and then made to cohere by heat-sealing.

When the sausages are cooked, for example, as in Figure 5, the casing, having a low boiling point, disintegrates and melts off. The surface of the emulsion is, at the same time, solidified or hardened by cooking to maintain the form of the sausage without a casing, as in Figure 6.

The sausage has all the advantages of a sausage using animal gut casing and at the same time is cheaper because of the lower cost of the casing. The casing can be made completely sterile.

This application is a continuation-in-part of application S. N. 185,610, filed September 19, 1950, now abandoned.

I claim:

1. An article of food, comprising a chain of sausages made up of an uncooked sausage emulsion contained in a tubular casing of polyethylene film and in direct contact therewith, the polyethylene having a molecular weight within the range of from about 16,000 to about 22,000 the film being coherent at normal temperatures, but adapted to disintegrate at cooking temperatures leaving the cooked emulsion free of casing, the casing normally retaining the emulsion in a consolidated mass so that the article has the self-sustaining form and substantially the normal appearance and feel of a similar article cased in an animal gut casing, the casing being drawn in at intervals to provide constricted portions separating the chain into individual sausages.

2. An article of food, comprising a sausage made up of an uncooked sausage emulsion permanently and completely filling a tubular substantially water-insensitive casing of polyethylene film and in direct contact therewith, the polyethylene having a molecular weight within the range of from about 16,000 to about 22,000 the film being coherent at normal temperatures, but adapted to disintegrate at cooking temperatures, leaving the cooked emulsion free of casing, the casing normally retaining the emulsion in a consolidated mass so that the article has the self-sustaining form and substantially the normal appearance and feel of a similar article cased in an animal gut casing, the casing being formed at each end of the sausage to provide parts sealing the ends of the sausage.

3. An article of food, comprising a sausage made up of an uncooked sausage emulsion permanently and completely filling a tubular substantially water-insensitive casing of polyethylene film and in direct contact therewith, the polyethylene having a molecular weight within the range of from about 16,000 to about 22,000 the film being coherent at normal temperatures, but adapted to disintegrate at cooking temperatures, leaving the cooked emulsion free of casing, the casing normally retaining the emulsion in a consolidated mass so that the article has the self-sustaining form and substantially the normal appearance and feel of a similar article cased in an animal gut casing, the casing being webbed at the ends of the sausage by opposed sides of the casing being juxtaposed and heat-sealed together.

References Cited in the file of this patent

UNITED STATES PATENTS

| | | |
|---|---|---|
| 2,604,244 | Tripp | July 22, 1952 |
| 2,627,466 | Lewis | Feb. 3, 1953 |

FOREIGN PATENTS

| | | |
|---|---|---|
| 650,698 | Great Britain | Feb. 28, 1951 |